2,784,161

TREATMENT OF WASH WATERS FROM ALKALI OIL REFINING

Marion B. Foley, Decatur, Ill., assignor to A. E. Staley Manufacturing Company, Decatur, Ill., a corporation of Delaware No Drawing. Application February 20, 1953, Serial No. 338,133

3 Claims. (Cl. 252—326)

This invention relates, generally, to innovations and improvements in the treatment of aqueous emulsions resulting from the alkali treatment of vegetable oils. More specifically, the invention pertains to the treatment of wash waters resulting from the caustic oil refining of vegetable oils such as corn oil and soybean oil so as to recover fatty acid values therefrom as soap stock and reduce the biochemical oxygen demand of the wash waters so as to make them suitable for discharge to sewers.

Large quantities of crude vegetable oils such as corn oil and soybean oil are alkali refined for the purpose of removing free fatty acids therefrom and to render the oil suitable for edible and other purposes requiring high quality oils. While the alkali or caustic refining of the vegetable oils may be carried out in a number of different ways in so far as specific details are concerned, in general, the alkali refining process consists of treating warm vegetable oil with an aqueous solution of caustic soda having a strength of approximately 10%, the amount of caustic used being slightly in excess of that required to neutralize the free fatty acids in the oil. The caustic soda solution is mixed into the warm oil in a suitable manner and the resulting soap stock or foots which forms is separated from the oil in a suitable manner. The soap stock or foots is an alkaline emulsion of water, soaps, free oil and any unneutralized fatty acids.

After the crude oil has been treated with the alkali solution and the oil has been separated from the soap stock or foots, the separated oil is then washed with water usually in two steps. For example, the alkali refined oil may be first washed with 15% by weight of zeolite-softened water and the water and oil phases separated, and then washed again with zeolite-softened water in the amount of about 10% based on the weight of the oil. The wash waters from the two washing steps are collected and combined. The present invention is directed primarily to the treatment of these wash waters.

While the exact composition of the wash waters will in any instance depend upon specific factors such as the type of vegetable oil being refined, the amount of alkali used in refining, the gum content of the oil, the free fatty acid value of the oil, and other factors, a typical wash water will be found to be an aqueous emulsion of soaps, oil and/or fatty acids, and may have about 1.5% total fatty acids, D. S. B. (dry substance basis). The wash water may have a total dry substance of about 1% by weight, a pH in the neighborhood of 11, and a B. O. D. (biochemical oxygen demand) of about 15,000 p. p. m.

In many instances vegetable oil refining plants are situated so that the wash waters have to be discharged to a sewer system. Because of the high B. O. D. value of the wash waters, their introduction in a sewer system represents a considerable pollution load. Accordingly, various measures and procedures have been considered and tried by vegetable oil refiners to decrease the B. O. D. value of the wash waters from caustic oil refining before sewering the same. One measure that has been tried is the direct acidification of the wash water but this has not proved to be successful because it does not have the desired effect upon the wash water. Other treatments which have been suggested, and used to some extent, include the treatment of the wash waters with calcium chloride, and with a combination of lime and ferrous sulphate. However, such chemicals are relatively expensive and the treatment times required when they are used are unduly long.

It has been found in accordance with the present invention that the wash waters resulting from the alkali oil refining of vegetable oils such as corn and soybean oils can be effectively and satisfactorily treated with lignin, and then acidified so as to lower the B. O. D. to a very small value and remove practically all of the fatty acid content from the water. The amount of lignin required is relatively small and the cost of the lignin and acid required is substantially less than the cost of the chemicals which have been previously used. Furthermore, the lignin treatment of the present invention is substantially quicker than treatment times required when other methods are used.

The object of the invention is the provision of an inexpensive, convenient and effective method of treating wash waters resulting from the alkali refining of vegetable oils, to reduce the B. O. D. value of such wash waters or emulsions as well as the fatty acid content thereof, so that when the wash water is sewered the pollution load is very small and only a small fraction of what the sewer load would otherwise be.

An object of the invention is the use of lignin in the treatment of wash waters resulting from caustic oil refining of vegetable oils, and other emulsions resulting from alkali treatment of vegetable oils, so as to materially reduce the B. O. D. value of such wash waters and emulsions and effect the separation of fatty substances therefrom.

Certain other objects of the invention will, in part, be obvious and will, in part, appear hereinafter.

For a more complete understanding of the nature and scope of the invention reference may now be had to the following detailed description thereof wherein certain illustrative embodiments of the invention will be described and others suggested.

*Example 1*

This example has been carried out in connection with a refinery wherein both corn oil and soybean oils were alkali refined. Two 18,000-gallon tanks were used, one of the tanks being used to collect wash water from the refinery, while the wash water in the other tank was undergoing treatment. On the average the wash water from this refinery ran about 1.5% total fatty acid, a total dry substance of about 1%, a pH of 11 to 11.5, and a B. O. D. of about 15,000 p. p. m. The wash water as discharged from the oil refining operation had a temperature of about 150° F. and sufficient sparge steam was added during the treatment to maintain the temperature of the wash water within the range of 140–160° F. 75 pounds of lignin, equivalent to about 30 grains per gallon of the wash water, was added to each 18,000-gallon tank of the wash water, with air or steam being used to effect agitation and mixing of the lignin throughout the contents of the tank. The contents of the tank were agitated and mixed for about 10 minutes after the lignin was added, the lignin being readily soluble in the alkaline wash water and readily going into solution with the fatty material. After mixing for about 10 minutes the pH of the wash water was adjusted to a value of about 2 with sulphuric acid and the contents of the tank agitated with steam, air or a mechanical agitator for about 20 minutes. At the end of about 20 minutes agitation there was a pronounced separation of the emulsion, the lignin being insoluble in the acid state. When this pronounced separation was noted, the agitation was discontinued and the contents of the tank were allowed to stand for approximately four hours during which time a floating layer of fatty material formed on top of a water layer. The water layer was drawn off to the sewer and the discharge of the water was stopped just as soon as the fatty layer reached the outlet in the bottom of the tank. The fatty material was then diverted for recovery as soap stock. The water drawn off from the tank had a B. O. D. of about 1,000 p. p. m. which reflects a 90–95% reduction in the original pollution load. The fatty acid concentration in the water was nil. The recovered fatty material was about 75–85% total fatty acids, D. S. B. (dry substance basis).

The treatment of the wash water may be carried out on a continuous basis if desired. Thus, the lignin solution may be continuously metered into a stream of the wash water from the caustic oil refining operation and thereafter acid may be added so as to acidify the wash water after which it is discharged into a flotation cell and air is used continuously to form a layer of the fatty material, this being continuously withdrawn and the water being continuously separated.

It has been found that the lignin treatment of the wash water in accordance with the present invention may be satisfactorily carried out at temperatures other than within the range of 140–160° F. used in Example 1. Thus, the treatment works well at a temperature of 85° F. and it has also been carried out at a temperature of 185° F. The difference is that at the higher temperatures the fatty layer dewaters more thoroughly than at the lower temperatures.

The amount of lignin used should be about 5 to 8% based on the weight of the total fatty acids present, as determined by A. O. C. S. official method G 3–39, 1946. In general, a dosage of at least about 25 grains of lignin per gallon of wash water is required for effective and efficient treatment. Dosage materially less than this effects only partial separation and treatment. Usually the wash water discharged from a particular refinery will have fairly uniform characteristics and the optimum lignin dosage may be readily determined by running a few test samples.

Preferably, the pH of the wash water is reduced to about 2 after the lignin has been added. However, the process may be satisfactorily carried out at pH values up to about 3.0. The adjustment of the pH may be obtained by either sulphuric acid or hydrochloric acid or other acids, but usually sulphuric acid will be used since it is the most economical.

The lignin treatment described above for treatment of wash waters may also be used to treat similar aqueous emulsions such as those obtained by using caustic to boil out or clean vegetable oil deodorizing equipment and railroad tank cars which have been loaded with crude vegetable oil.

In view of the foregoing disclosure, those skilled in the art will be able to practice the invention either according to the specific embodiments and directions set forth above, or according to other obvious embodiments. Accordingly, all matter set forth above is intended to be interpreted as illustrative and not in a limiting sense.

What is claimed as new is:

1. The method of treating wash water obtained in the alkali refining of veegtable oils so as to recover the fatty acid values therefrom and lower the B. O. D. value thereof which comprises, maintaining the temperature of the wash water within the range of about 140–160° F., adding lignin to the wash water in an amount ranging between about 25 to 30 grains of lignin per gallon of wash water, acidifying the wash water to a pH within the range of about 3.0 to 2, and separating the resulting bottom water layer and the supernatant fatty layer.

2. The method of treating wash water obtained in the alkali refining of soybean oil so as to recover the fatty acid values therefrom and lower the B. O. D. value thereof which comprises, maintaining the temperature of the wash water within the range of about 140–160° F., adding lignin to the wash water in an amount ranging between about 25 to 30 grains of lignin per gallon of wash water, acidifying the wash water to a pH within the range of about 3.0 to 2, and separating the resulting bottom water layer and the supernatant fatty layer.

3. The method of treating wash water obtained in the alkali refining of corn oil so as to recover the fatty acid values therefrom and lower the B. O. D. value thereof which comprises, maintaining the temperature of the wash water within the range of about 140–160° F., adding lignin to the wash water in an amount ranging between about 25 to 30 grains of lignin per gallon of wash water, acidifying the wash water to a pH within the range of about 3.0 to 2, and separating the resulting bottom water layer and the supernatant fatty layer.

References Cited in the file of this patent

UNITED STATES PATENTS

| | | |
|---|---|---|
| 2,200,784 | Wallace | May 14, 1940 |
| 2,415,439 | Nelson | Feb. 11, 1947 |